March 16, 1948. G. BARDIN 2,437,675
CURRENT GENERATING GEAR FOR POCKET ELECTRIC LAMPS
Filed April 16, 1941

Inventor
Georges Bardin
By [signature]
his Atty.

Patented Mar. 16, 1948

2,437,675

UNITED STATES PATENT OFFICE 2,437,675

CURRENT-GENERATING GEAR FOR POCKET ELECTRIC LAMPS

Georges Bardin, Tournus, France; vested in the Attorney General of the United States Application April 16, 1941, Serial No. 388,811
In France May 11, 1940

6 Claims. (Cl. 171—209)

Several types of pocket or portable electric lamps containing a manually operated current-generating magneto are already to be found on the market as substitutes for such lamps containing a small dry battery which, as is well known, becomes rapidly exhausted. The principal disadvantage of such lamps comprising a magneto as a source of current is that the gear used for transmitting the manual impulses to the rotor of the magneto is of a complicated and cumbersome structure, whereby the rotor and stator of the magneto itself are of correspondingly reduced volume and output, so that in order to properly generate the current which is necessary for ensuring an adequate light power, the rotational speed of the magneto rotor must reach very high values of the order of 8,000 to 10,000 R. P. M. This involves the necessary use of several gear couples operated by racks or similar contrivances which absorb a substantial proportion of the effort and require undue lubrication and a very minute adjustment of the parts, also rubber mountings capable of avoiding jerks and "whistling" as caused by too quick meshing of the teeth of the gears.

An object of the present invention is to provide a current-generating gear for pocket or portable electric lamps of the aforesaid type having such an improved and simplified structure as to avoid the foregoing disadvantages, said improved gear comprising one gear couple only, thus leaving a much larger space for the accommodation of the magneto itself and lessening losses due to frictions, while not increasing the overall size of the self-contained lamp.

Another object of the invention is to provide a current-generating gear for lamps of the aforesaid type wherein the parts of the gear are so co-related that intermediate two consecutive impulses of the manually operated actuator such as a pivotal and reciprocatory handle, all such parts remain motionless with the exception of the magneto rotor whose momentum may be better maintained and regularized by providing the same with a flywheel made of a non-magnetic metal or alloy.

Still another object of the invention is to provide a novel current-generating gear for pocket electric lamps of the aforesaid type wherein the rotational speed of the magneto rotor is held within relatively small limits, thus considerably lessening vibrations and frictions and consequently doing away with the need of rubber mountings and frequent lubrication.

A further object of the invention is to provide a novel current-generating gear for lamps of the aforesaid type wherein the parts of the gear couple may be constructed with less accuracy, thus diminishing to a material extent the manufacturing cost as well as the risk of breakdown while rendering the general construction more rugged and durable.

A still further object of the invention is to provide a novel current-generating gear for lamps of the aforesaid type wherein the rotor when advantageously fitted with a flywheel adapted to regularize its momentum and to ensure a better employment of the characteristics of the magnetic circuit can be readily cast in the form of a solid disc having a central bore in which a core formed with a ratchet-carrying flange can be readily accommodated and held in proper centered position.

With these and such other objects in view as will incidentally appear hereafter, the invention comprises the novel construction, combination and arrangement of parts that will now be described with reference to the accompanying diagrammatic drawing exemplifying the same and forming a part of the present disclosure.

In the drawing.

Like reference numerals designate like parts throughout the several figures.

Figure 1:
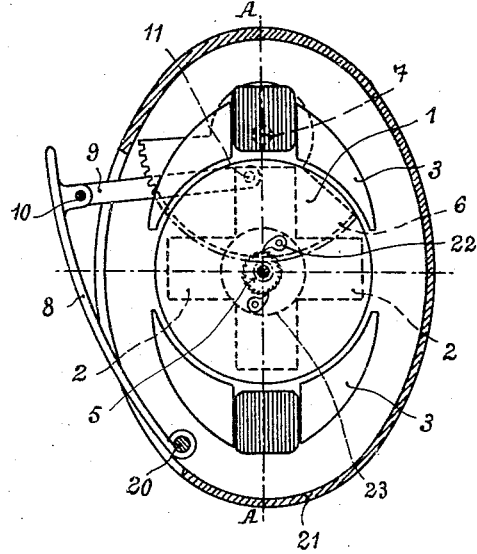
Figure 1 is a view partly in section of the electric lamp with its current-generating gear accommodated in its casing.
Figure 2:
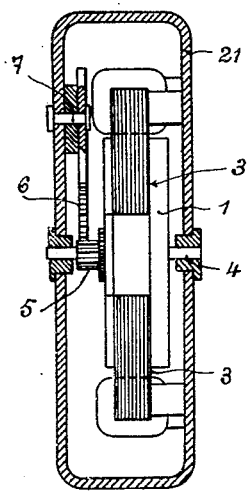
Figure 2 is a sectional view on the line A—A of Fig. 1.

In the showing of Figs. 1 and 2, the magneto primarily comprises a star-shaped rotor 1 made of soft iron having four poles 2 made of a magnetic alloy, and a field stator 3 provided with oppositely arranged windings and with a pair of tapering polar shoes. This construction is not evidently limitative, it being possible of course to use a magneto comprising a rotor with two, six, eight or more poles in even number and a corresponding stator having a polar shoe for each pair of such poles. The rotor or magnet proper is preferably made of nickel-aluminum or a similar alloy.

The axle 4 of the rotor 1 journalled in the side plates of the box-like casing 21 has mounted thereon a unidirectional impeller or free wheel clutch, for example a ratchet pinion 5 freely rotatable on axle 4 and associated with a pair of pawls 22, 23 pivotally mounted on the rotor 1, the pinion 5 meshing with a toothed sector 6 fast on an axis 7. The toothed sector 6 is driven by means of a reciprocatory actuator or handle 8 pivotally carried at 20 on the casing 21 and transmitting its motion through a link 9 pivoted on a stud 10 on said handle and on a stud 11 on said sector. As shown in Fig. 1, the stud 11 is so offset from the axis 7 and the parts 6, 8 and 9 are so located and mutually associated as to provide a multiplication of the angular motion imparted by the handle 8 and transmitted to the toothed sector 6 thereby obviating the use of cumbersome gear trains and the resultant loss of energy due to frictional resistances.

By a suitable adjustment or setting of the pivotal points 10 and 11, the proper increasing ratio of the gearing which may be conveniently equal to 1:2.5 may be obtained. Such ratio may be conveniently altered when required without changing the parts, it being sufficient in such an event to change the positions of the point of operative engagement of the link 9.

Figure 3:
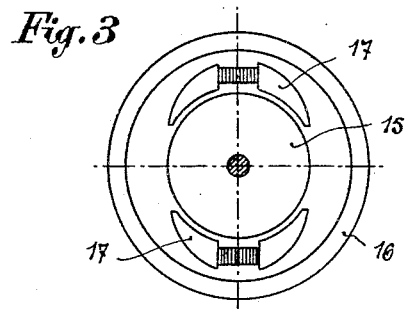
Figures 3 and 4 are respectively a plan view and a sectional view of a magneto whose rotor is fitted with a flywheel.
Figure 4:
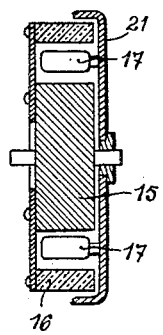

The device shown in Figs. 3 and 4 shows the construction of the magneto as fitted with a flywheel adapted to maintain or regularize its momentum. This device comprises a magnetic rotor 15 constituted by a solid disc free of projecting poles and made of a nickel-aluminum or like alloy. This rotor has its axis provided with a free wheel clutch as shown in Fig. 1 and is operatively connected to a flywheel 16 made of a non-magnetic metal (preferably lead) arranged so as to circumscribe the stator 17.

As will be understood, the relatively high kinetic energy which, considering its weight, is imparted to the flywheel 16 by each impulse derived from a motion of the handle 8 enables it to maintain the rotational speed of the magnet substantially constant during a much longer time after each of such impulses, whereby the tension of the generated electric current decreases slowly. This makes it possible to obtain proper and steady voltage by using one magnetic couple (rotor-stator) of small overall size and causing it to revolve at moderate speed.

The device assembly is actuated by the handle, link and toothed sector as described with reference to Fig. 1.

Figure 5:
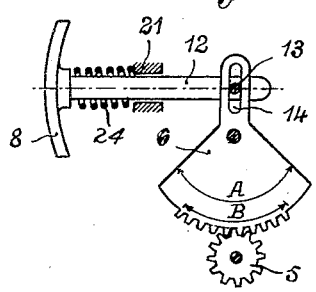
Figure 5 is a fragmentary detail view showing a modified construction of the actuator, link, toothed sector and ratchet.

In the constructional modification shown in Fig. 5, the link 9 is replaced by a sliding rod 12 fitted with a pin 13 engaging through a slot 14 in an extension of the toothed sector 5. Around the rod 12 is coiled a helical retract spring 24 abutted between a boss on the handle 8 and a shoulder on the casing 21. The sector 6 may be provided with teeth only on a portion B of its arc-shaped face A, so that at the end of each rocking motion of this sector, it no longer engages the ratchet pinion. This reduces frictional stresses because otherwise when the sector 6 remains in constant mesh with the pinion 5, the pawls such as 22 and 23 rub its teeth all the time and take up an important fraction of the momentum of the magnet secured to said pinion.

Figure 6:
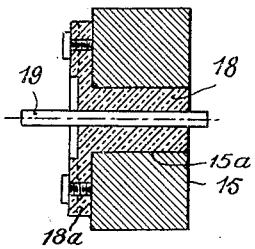
Figure 6 is a sectional view showing a preferred structure of the magneto rotor, central core and associated parts.

According to the method of making the rotor or magnet as shown in Fig. 6, said magnet 15 is formed as a solid disc having a central bore 15a which may be left bare as the magnet results from the casting operation or may be machined afterwards. In this bore is accommodated a centering core 18 provided with a flange 18a serving as a carrier for the free wheel clutch. The core 18 is conveniently cast and made either of white metal or "Bakelite." This method makes it possible to substitute for the disc carrying the pawls and pawl springs which is costly to produce since it must be reduced in diameter, cut away and pierced, a cast part whose holes and grooves are produced in the casting operation itself. Moreover, this method also does away with difficulties encountered for securing the disc to the magnet, it being known that magnetic metals and particularly nickel-aluminum alloys cannot be machined with usual tools and must be wrought by means of grinding wheels.

As an alternative of the method just described, the rotational axis 19 of the magnet may be cast in situ when the white metal or "Bakelite" is injected into the die, thereby also obviating the difficulties otherwise encountered for securing the same.

It will be appreciated from the foregoing description that the objects of the invention are satisfactorily fulfilled by this improved construction since the use of one gear couple diminishes frictions, vibrations and lubrication needs, avoids rubber mountings sometimes called "silent-blocks" and therefore reduces costs of manufacture and assembly while leaving more room for the current-generating parts themselves, and while accordingly permitting them to be rotated at a lower speed. Furthermore, the provisions of a flywheel in conjunction with the unidirectional impeller comprising the ratchet maintains and regularizes the momentum of the rotor, which renders the electric current thus generated more regular and avoids flickering of the light. Lastly, the provision of teeth on a portion only of the impeller sector materially lessens frictions and therefore the wear and tear of the parts.

As a consequence of these combined factors, the lamp thus equipped while having a nicely limited overall size which makes it convenient and handy to carry about and accommodate in a garment pocket possesses high luminous efficiency and requires only such a limited manual effort as will warrant prolonged use without fatigue to the user's hand.

The constructional details might vary of course without departing from the scope of the subjoined claims.

What is claimed is:

1. A current-generating gear for pocket electric lamps comprising an actuator, a unidirectional impeller, a link interconnecting the actuator and impeller and having its pivotal connection with said impeller offset from the impeller axis, a magnetic rotor driven directly by the impeller and fitted with an annular non-magnetic flywheel, and a stator having oppositely disposed windings and encompassing the rotor, said rotor and stator being circumscribed and peripherally enclosed by the flywheel.

2. A current-generating gear for pocket electric lamps comprising an actuator, a unidirectional impeller including a rockable toothed sector meshing with a small ratchet pinion, a link interconnecting the actuator and sector and having its pivotal connection with the sector offset from the rocking axis of said sector, a magnetic rotor driven by said pinion, a stator encompassing the rotor, and an annular fly-wheel rigidly connected to the rotor and peripherally enclosing the stator.

3. A current-generating gear for pocket electric lamps comprising a pivotable actuator, a unidirectional impeller including a rockable toothed sector meshing with a small ratchet pinion, a link pivoted to the actuator and to the sector, the pivot between link and sector being offset from the rocking axis of said sector, a magnetic rotor driven by said pinion, a two-part stator having tapering polar shoes encompassing the rotor, and an annular flywheel rigidly connected to the rotor and peripherally enclosing the stator.

4. A current-generating gear for pocket electric lamps comprising a pivotable actuator, a unidirectional impeller including a rockable toothed sector meshing with a small ratchet pinion, a spring-urged slidable link interconnecting the actuator and sector the pivot between link and sector being offset from the rocking axis of said sector, a magnetic rotor driven by said pinion, a stator encompassing the rotor, and an annular flywheel rigidly connected to the rotor and peripherally enclosing the stator.

5. A current-generating gear for pocket electric lamps comprising a pivotable actuator, a unidirectional impeller including a rockable sector having teeth on a portion of its arc-shaped periphery and meshing with a small ratchet pinion, a link pivoted to the actuator and having a pin and slot connection with the sector, said connection being offset from the rocking axis of said sector, a magnetic rotor driven by said pinion, a stator encompassing the rotor, and an annular flywheel rigidly connected to the rotor and peripherally enclosing the stator.

6. In a pocket or portable electric lamp having a box-like casing, a current-generating gear comprising a reciprocatory actuating handle pivotally carried by the casing, a unidirectional impeller including a toothed sector pivoted to said casing and meshing with a small ratchet pinion loosely mounted on an axle journalled in said casing, a link pivotally connected at its respective ends to the actuating handle and to the sector, the pivot between link and sector being offset from the rocking axis of said sector, a rotor fast on the pinion axle and made of nickel-aluminum alloy, pawl means pivoted on said rotor and engaging said ratchet pinion, a stator partly encompassing the rotor and having oppositely disposed windings and tapering polar shoes, and an annular flywheel rigidly connected to the rotor and peripherally enclosing the stator.

GEORGES BARDIN.

REFERENCES CITED

The following references are of record in the file of this patent:

UNITED STATES PATENTS

| Number | Name | Date |
| --- | --- | --- |
| 2,133,420 | Brooks | Oct. 18, 1938 |
| 1,489,276 | Railing et al. | Apr. 8, 1924 |
| 1,429,601 | Luzy | Sept. 19, 1922 |
| 1,506,282 | Barbieri | Aug. 26, 1924 |
| 2,213,724 | Vogel | Sept. 3, 1940 |